(12) United States Patent
Fitzmaurice et al.

(10) Patent No.: US 8,719,204 B2
(45) Date of Patent: May 6, 2014

(54) DISPLAYING RESOURCES BASED ON SHARED CONTEXTS

(75) Inventors: George Fitzmaurice, Toronto (CA); Tovi Grossman, Toronto (CA); Justin Frank Matejka, Etobicoke (CA); Wei Li, Waterloo (CA)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 13/604,595

(22) Filed: Sep. 5, 2012

(65) Prior Publication Data

US 2013/0006907 A1 Jan. 3, 2013

Related U.S. Application Data

(63) Continuation of application No. 12/431,657, filed on Apr. 28, 2009, now Pat. No. 8,271,410.

(60) Provisional application No. 61/118,147, filed on Nov. 26, 2008.

(51) Int. Cl.
*G06F 17/00* (2006.01)
*G06F 15/18* (2006.01)
*G06F 7/00* (2006.01)
*G06N 99/00* (2010.01)

(52) U.S. Cl.
CPC .................................... *G06N 99/005* (2013.01)
USPC ................ 706/45; 706/15; 707/609; 715/200

(58) Field of Classification Search
None
See application file for complete search history.

(56) References Cited

U.S. PATENT DOCUMENTS 7,865,829 B1 * 1/2011 Goldfield et al. ............. 715/708

* cited by examiner

*Primary Examiner* — Alan Chen
(74) *Attorney, Agent, or Firm* — Patterson & Sheridan, LLP

(57) ABSTRACT

A user data engine residing on an endpoint machine generates a current user context reflecting a specific flow of operations performed by an end-user when interacting with a software application. A context engine residing on a sever machine compares the current user context to one or more stored user contexts included in a context database and generates a similarity value based on each comparison. A resource engine identifies resources in a resource database that are associated with the stored user contexts and then generates a relevance score for each resource based on the similarity scores corresponding to the stored user contexts with which those resources are associated. The resource engine transmits a resource list reflecting the identified resources to the user data engine based on the relevance scores. The user data engine displays on a display screen of the endpoint machine information associated with resources reflected in the resource list.

20 Claims, 8 Drawing Sheets

DISPLAYING RESOURCES BASED ON SHARED CONTEXTS

CROSS-REFERENCE TO RELATED APPLICATIONS

This application is a continuation of the U.S. patent application having Ser. No. 12/431,657, filed Apr. 28, 2009, now U.S. Pat. No. 8,271,410 which claims the priority benefit of U.S. Provisional Patent Application Ser. No. 61/118,147, filed Nov. 26, 2008. Both of these related applications are hereby incorporated herein by reference.

BACKGROUND OF THE INVENTION

1. Field of the Invention

The present invention generally relates to software usage and, more specifically, to displaying resources based on shared contexts.

2. Description of the Related Art

A wide variety of software applications are currently available to end-users, including computer-aided design (CAD) applications, computer graphics applications, animation applications, word processing applications, and computer programming applications, among others. Many of these software applications are provided with a "help" database that provides an end-user with information related to the usage of the software application. For example, a help database associated with a CAD application may include a tutorial that teaches an end-user how to construct different geometrical shapes.

A conventional help database typically allows an end-user to search for different help topics by inputting one or more keywords into a query window. Search software searches the help database based on the one or more keywords and returns a list of topics to the end-user. The end-user may then view help files associated with each returned topic. For example, an end-user of a CAD application may search for "shapes" and be provided with a list of topics that includes "drawing triangles," "drawing squares," and so forth. Each topic provided by the help database may be associated with a help file, such as a narrative that describes how to use a particular feature of the software application, a screenshot that illustrates the particular feature, or other information that enables the end-user to learn to use the software application. The pool of help files provided by the help database is typically limited in scope to a finite number of topics. Additionally, the pool of help files typically cannot be expanded to include additional help files.

Some conventional help databases are configured to automatically provide an end-user with help files related to an action currently being performed by the user. For example, if an end-user of a word processing application types a date in the upper right-hand corner of a page, then an automated help program may be triggered to provide the end-user with a help file related to letter writing. Similarly to the help database described above, the pool of help files associated with the automated help program is typically limited in scope and cannot be expanded to include additional help files.

One drawback of conventional approaches is that the pool of help files shipped with a particular application only addresses certain topics. Thus, in situations where the pool of help files does not include a help file pertinent to a particular problem encountered by the end-user, the end-user may never obtain information helpful to solving that problem. Another drawback of conventional approaches is that the original pool of help files cannot be expanded to include additional help files. Therefore, the help database may never include information related to a particular problem if that problem is unaddressed by the pool of help files.

As the foregoing illustrates, there is a need in the art for a more effective way to provide guidance to users of software applications.

SUMMARY OF THE INVENTION

Embodiments of the invention provide a computer-implemented method for generating a similarity value between a current user context generated on an endpoint machine and a stored user context stored in a context database for use in retrieving one or more application resources for an end-user. The method includes receiving the current user context from the endpoint machine, where the current user context reflects a first flow of operations performed by an end-user when interacting with a software application executing on the endpoint machine. The method further includes comparing the current user context to the stored user context, where the stored user context reflects a second flow of operations performed during a prior interaction with the software application or with an instance or a version of the software application. The method further includes generating the similarity value for the stored user context based on comparing the current user context to the stored user context, where the similarity value indicates a degree of similarity between the first flow of operations and the second flow of operations. The method further includes transmitting the similarity value to a resource engine for further processing.

Embodiments of the invention further provide a computer-implemented method for providing one or more resources to an end-user of a software application, where the end-user has an associated current user context that reflects a first flow of operations performed by the end-user when interacting with the software application on an endpoint machine. The method includes receiving a similarity value from a context database that is associated with a stored user context stored in the context database, where the similarity value indicates a degree of similarity between the current user context and the stored user context, and where the stored user context reflects a second flow of operations performed during a prior interaction with the software application or with an instance or a version of the software application. The method further includes identifying one or more resources stored in a resource database and associated with the stored user context, where the one or more resources include content related to the first flow of operations. The method further includes generating a relevance score for each of the one or more resources based at least in part on the similarity value associated with the stored user context. The method further includes generating a resource list that reflects at least one of the one or more resources based on the relevance scores generated for the one or more resources. The method further includes transmitting the resource list to the endpoint machine.

Advantageously, embodiments of the invention provide the end-user with access to an expansive pool of resources that may be relevant to a flow of operations currently being performed by the end-user with the software application.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
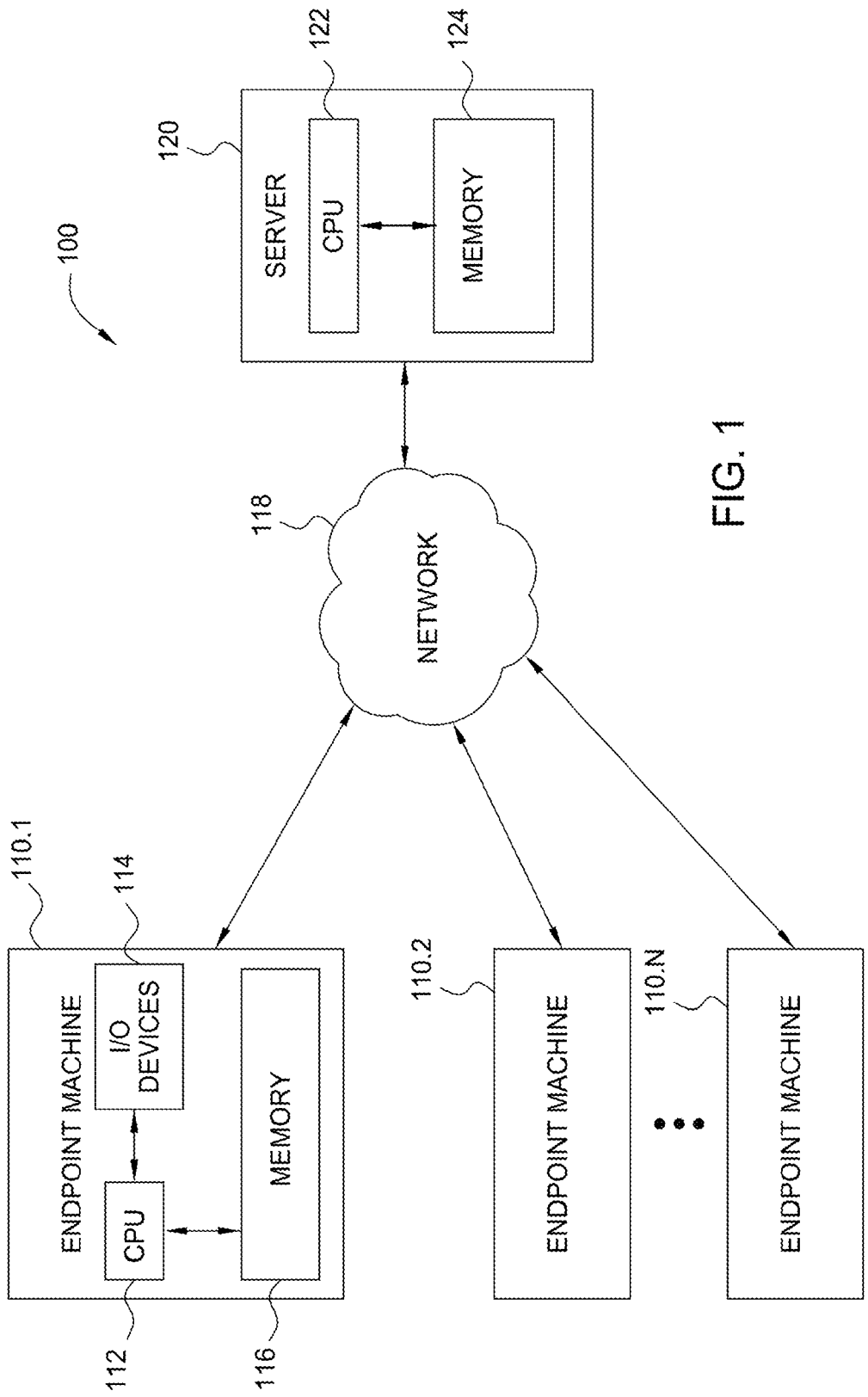
FIG. 1 is a conceptual diagram that illustrates a computer system configured to implement one or more aspects of the invention.

FIG. 1 is a conceptual diagram that illustrates a computing system 100 configured to implement one or more aspects of the invention. As shown, the computing system 100 includes endpoint machines 110.1-110.N, a network 118, and a server 120. The server 120 and the user terminals 110.1-110.N are computer systems that are each connected to the network 118 and may each transmit and receive data via the network 118. The network 118 may be any type of network, including the World Wide Web, the Internet, a local area network (LAN), a wide area network (WAN), an intranet, a cellular network, or any other technically feasible type of network.

The endpoint machines 110.1-110.N may each be a laptop computer, a desktop computer, a cell phone, a personal digital assistant (PDA), or another type of computer/computing device. In one embodiment, the endpoint machine 110.1 is substantially similar to the endpoint machines 110.2-110.N. As shown, the endpoint machine 110.1 includes a CPU 112 coupled to one or more input/output (I/O) devices 114 and to a memory 116.

The CPU 112 is a processor configured to execute program instructions. The CPU 112 may be, in some embodiments, implemented as a graphics processing unit (GPU), an application-specific integrated circuit (ASIC), a field programmable gate array (FPGA), or another type of processing unit. The CPU 112 executes program instructions that may be stored in the memory 116 or stored in one or more of the I/O devices 114. The program instructions executed by the CPU 112 may also be received via the network 118 and stored in the memory 116 and/or in the I/O devices 114.

The I/O devices 114 allow the CPU 112 to receive and to transmit data and may include user input devices such as a keyboard, a keypad, or a mouse, storage devices and disk drives such as a tape drive, a floppy drive, a hard disk drive or a compact disk drive, and various display devices, such as a cathode-ray tube (CRT) monitor or a liquid-crystal display (LCD) monitor. The I/O devices 114 may also include various other I/O devices.

The memory 116 may be a flash memory module, a hard disk drive, a read-only memory (ROM) unit, or another type of memory unit configured to store data. In one embodiment, the memory 116 stores a driver comprising program instructions that, when executed by the CPU 112, translates program instructions into different types of machine code. In another embodiment, the memory 116 may be accessed by the I/O devices 114.

As described in greater detail below in FIG. 2, the memory 116 includes a "user data engine" (UDE) that is configured to generate a "current user context" that reflects a specific flow of operations performed by an end-user of the endpoint machine 110.1 when interacting with a software application executing on the endpoint machine 110.1. The current user context is a set of data that characterizes the interactions between the end-user and the software application. The UDE records inputs issued by the end-user to the software application and, additionally, records outputs generated by the software application in response to those user inputs. The UDE then generates the current user context based on the recorded inputs and outputs. The UDE may also rely on personal and/or professional information associated with the end-user when generating the current user context.

The UDE transmits the current user context to the server 120 and, in return, receives from the server 120 a resource list that specifies one or more "resources" most relevant to the flow of operations currently being performed by the end-user, as reflected in the current user context transmitted by the UDE to the server 120. A resource may include, among other things, a help file, a video, or a sample of executable code. Again, each resource specified in the resource list is related to the flow of operations being performed by the end-user and reflected in the current user context transmitted to the server 120. The UDE displays to the end-user information related to each resource specified in the resource list, such as, for example, a web link to the resource. In one embodiment, the UDE retrieves one or more resources specified in the resource list from the I/O devices 114, the memory 116, or the network 118, and then displays those resources to the end-user via the I/O devices 114. In another embodiment, the UDE may receive resources from the server 120 via the network 118 and then display to the end-user information associated with those resources.

The server 120 may be, for example, a single computer system or, alternatively, a distributed computer system including different processing clusters that occupy different physical locations. As shown, the server 120 includes a central processing unit (CPU) 122 coupled to a memory 124. The CPU 112 may be, in some embodiments, implemented as a graphics processing unit (GPU), an application-specific integrated circuit (ASIC), a field programmable gate array (FPGA), or another type of processing unit. The memory 124 may be a flash memory module, a hard disk drive, a read-only memory (ROM) unit, or another type of memory unit configured to store data.

As described in greater detail below in FIG. 3, the memory 124 of the server 120 includes a "context engine," a "resource engine," a "context database," and a "resource database." The context engine is configured to receive the current user context from the UDE and to compare the current user context to one or more "stored user contexts" included in the context database. The stored user contexts may be generated based on a flow of operations previously performed by the end-user when interacting with the software application executing on the endpoint machine 110.1 or, alternatively, may be pre-loaded into the context database. In one embodiment, the stored user contexts are received from the endpoint machines 110.1-110.N. The context engine identifies one or more stored user contexts that are similar to the current user context received from the UDE. Based on the identified stored user contexts, the resource engine identifies one or more resources that may be relevant to the flow of operations performed by the end-user. The resource engine generates a resource list that reflects the identified resources and then transmits the resource list to the UDE via the network 118.

Figure 2:
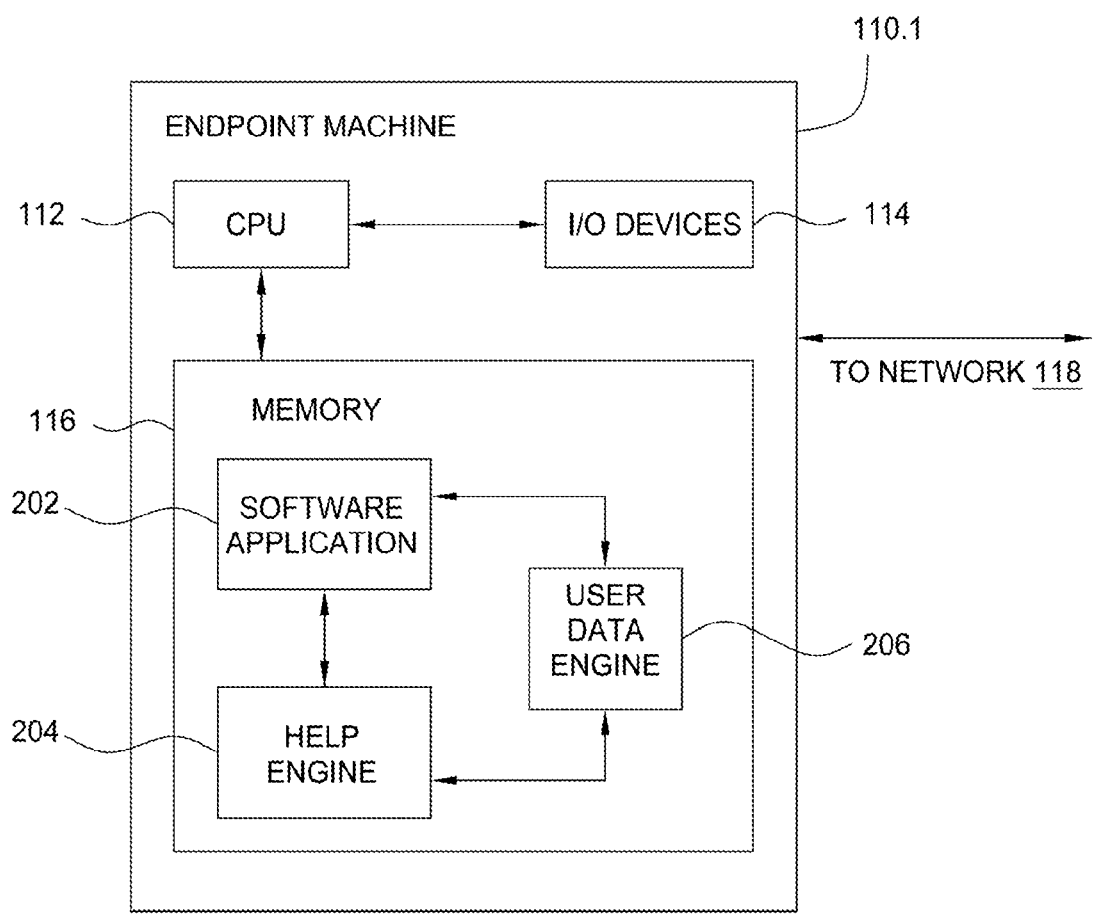
FIG. 2 is a conceptual diagram that illustrates an endpoint machine, according to one embodiment of the invention.

FIG. 2 is a conceptual diagram that illustrates the endpoint machine 110.1, according to one embodiment of the invention. As shown, the endpoint machine 110.1 includes a software application 202, a help engine 204, and a UDE 206 that are each included within the memory 116 and are each coupled to one another. The software application 202, the help engine 204 and the UDE 206 are software programs comprising program instructions associated with a particular instruction set architecture (ISA). However, those skilled in the art will recognize that these software programs may also be implemented as one or more hardware units or implemented as a combination of software programs and hardware units.

The software application 202 may be any technically feasible software application. The software application 202 may be, for example, a computer-aided design (CAD) application, a computer graphics application, an animation application, a word processing application, or a computer programming application, among others. The software application 202 may receive input from the I/O devices 114 or transmit output to the I/O devices 114. Additionally, the software application 202 may access the network 118 in order to download data from or upload data to other computer systems via the network 118. For example, the software application 202 may access the server 120 and/or another endpoint machine via the network 118.

The help engine 204 provides a user with information related to the software application 204. In one embodiment, the help engine 204 is included within the software application 202. In another embodiment, the help engine 204 is an independent software program that is not included within the software application 202 and is not shipped with the software application 202. The help engine 204 includes one or more resources such as, for example, help files, videos, executable code, instructions, narratives, tutorials, command listings, and screenshots related to the software application 202. For example, if the software application 202 is a CAD application, then the help engine 204 may provide a tutorial related to drawing a cube. In one embodiment, the one or more resources included within the help engine 204 may be accessed via a keyword search. In another embodiment, the help engine 204 automatically provides one or more resources to the end-user when the end-user performs one or more operations in a set of pre-defined operations.

The UDE 206 generates the current user context described in FIG. 1 based on a flow of operations performed by the end-user when interacting with the software application 202. In one embodiment, the current user context includes "command data" recorded by the UDE 206. The command data includes a list of one or more commands issued by the end-user to the software application 202 and the frequency with which those commands are issued. The commands issued by the end-user may include keystrokes and keystroke combinations, selections of menu items or check boxes, selections of different tools (e.g., drawing tools in a CAD application), or activation of different features of the software application 202. The frequency with which each command in the command data is issued may be represented as a decimal value or, alternatively, may be represented as a count of the number of times the command has been issued.

In alternative embodiments, the current user context may include "external software data," "working file data," "file content data," and/or "profile data." The external software data is recorded by the UDE 206 and includes a list of the names of each software application that executes on the CPU 112 other than the software application 202. The external software data may also include a list of the names of each software application that transmits data to and/or receives data from the software application 202.

The working file data is recorded by the UDE 206 and includes a list of the files edited by the end-user and other information associated with those files. For example, the UDE 206 could record the name, size and type of each file edited by the end-user. A file edited by the end-user may be associated with the software application 202 or, alternatively, may be associated with a different software application executing on the CPU 112.

The file content data is recorded by the UDE 206 and includes a list of different types of content edited by the end-user. For example, when the software application 202 is a CAD application, the UDE 206 records a list of object types within a drawing file edited by the end-user via the CAD application as well as other information associated with each objet type. In this example, the file content data may include a number of polygons, textures, images and/or poly lines included in the drawing file. Those skilled in the art will recognize that the file content data may specify a wide range of different types of file content depending on the specific functionality of the software application 202.

The profile data also is recorded by the UDE 206 and includes personal and/or professional information related to the end-user. The profile data may include, for example, the name of the company that employs the end-user, the job title of the end-user, or the educational background of the end-user, among other things.

For the sake of clarity, it will be emphasized that, in various embodiments, the current user context may include any combination of two or more of the command data, the external software data, the working file data, the file content data, and the profile data. Those skilled in the art will recognize that the current user context may include a wide variety of different types of information related to operations that the end-user may perform when interacting with the software application 202.

Once the UDE 206 generates the current user context, the UDE 206 transmits the current user context to the server 120 via the network 118.

Figure 3:
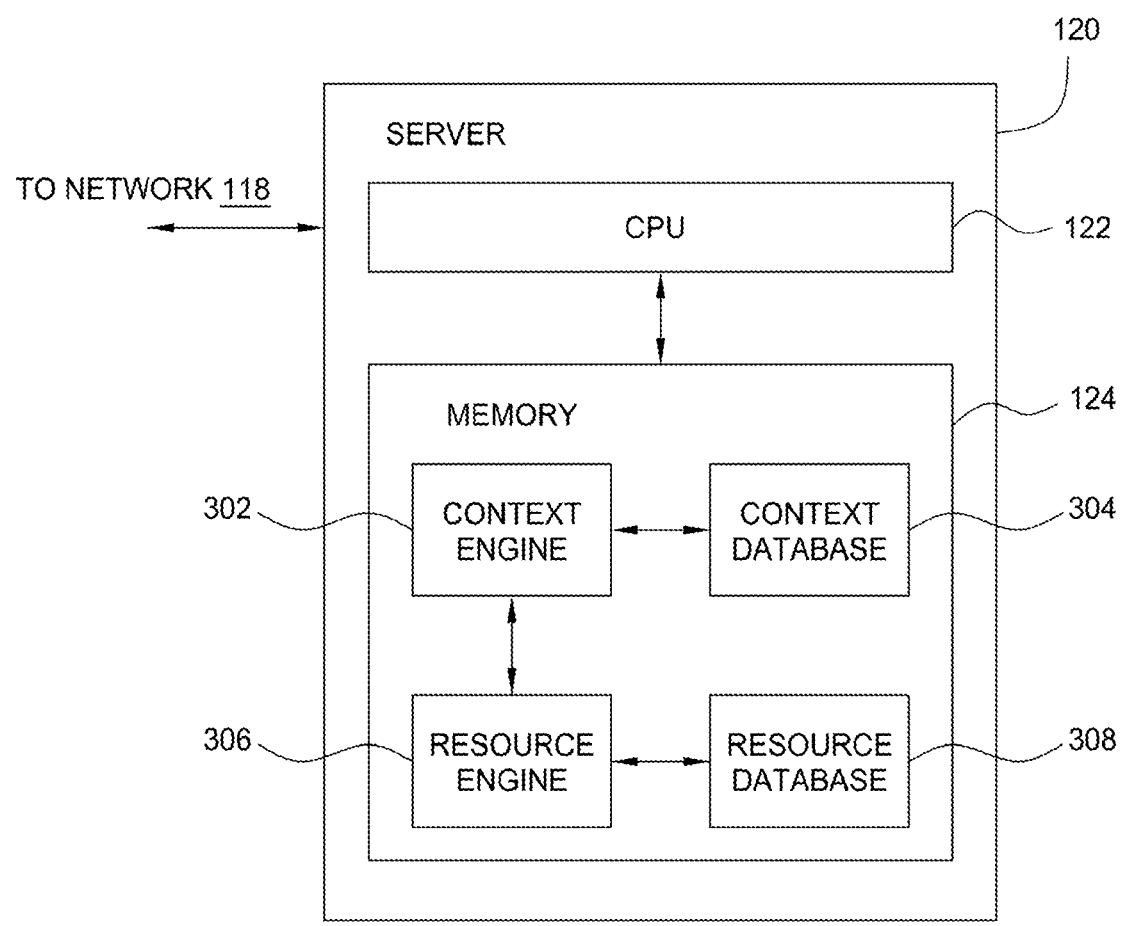
FIG. 3 is a conceptual diagram that illustrates a server, according to one embodiment of the invention.

FIG. 3 is a conceptual diagram that illustrates the server 120, according to one embodiment of the invention. As shown, the server 120 includes a context engine 302, a context database 304, a resource engine 306, and a resource database 308 that are each included within the memory 124. The context engine 302 is coupled to the context database 304 and to the resource engine 306, and the resource engine 306 is coupled to the resource database 308. The context engine 302 and the resource engine 306 are software programs comprising program instructions associated with a particular instruction set architecture (ISA). However, those skilled in the art will recognize that these software programs may also be implemented as one or more hardware units or implemented as a combination of software programs and hardware units.

As previously described, upon receiving the current user context from the UDE 206, the context engine 302 compares the current user context to one or more of the stored user contexts in the context database 304 and generates a similarity value for each comparison. The similarity value indicates a degree of similarity between the current user context and the particular stored user context to which the current user context is compared.

The context engine 302 may employ one or more different techniques to generate the similarity value depending on the data included within the current user context and the data included within the particular stored user context to which the current user context is compared. In embodiments where the current user context and the stored user context each include command data, the context engine 302 may generate a similarity value according to Equation 1:

$$S_{CMD} = \frac{\left\{\sum_{a=1:n} CMD_{ia} * CMD_{ja}\right\}}{\left\{\sum_{a=1:n} CMD_{ia}^2\right\}^{\frac{1}{2}} * \left\{\sum_{a=1:n} CMD_{ja}^2\right\}^{\frac{1}{2}}} \quad (1)$$

As shown, Equation 1 defines the similarity value $S_{CMD}$ based on command data $CMD_{ia}$ that is included in the current user context and also based on command data $CMD_{ja}$ that is included in the stored user context. The value a ranges from 1 to n, where n is equal to a number of different sets of command data that may be included in the current user context and/or the stored user context.

In embodiments where the current user context and the stored user context each include external software data, the context engine 302 may generate a similarity value according to Equation 2:

$$S_{EXT} = \frac{|E_i \cap E_j|}{|E_i \cup E_j|} \quad (2)$$

As shown, Equation 2 defines the similarity value $S_{EXT}$ based on external software data $E_i$ that is included in the current user context and also based on external software data $E_j$ that is included in the stored user context.

In embodiments where the current user context and the stored user context each include working file data, the context engine may generate a similarity value according to Equation 3:

$$\frac{\sum_{a=u,s,t} \frac{|LCS(str_{ai}, str_{aj})| * weight_a}{|MaxLength(str_{ai}, str_{aj})|}}{\sum_{a=n,s,t} weight_a} \quad (3)$$

LCS( ) is a function that compares two strings of characters and identifies the longest sequence of characters that is common to both of the two strings of characters. MaxLength( ) is a function that determines the maximum length of two strings of characters. In Equation 3, $str_{ai}$ is a name of a file specified in working file data included in the current user context, while $str_{aj}$ is a name of a file specified in working file data included in the stored user context. Additionally, $weight_a$ is a parameter that may take on a range of values.

In embodiments where the current user context and the stored user context are each generated based on file content data, the context engine may generate a similarity value according to Equation 4:

$$S_{FCD} = \frac{\left\{\sum_{a=1:n} F_{in} * F_{ja}\right\}}{\left\{\sum_{a=1:n} F_{ia}^2\right\}^{\frac{1}{2}} * \left\{\sum_{a=1:n} F_{ja}^2\right\}^{\frac{1}{2}}} \quad (4)$$

As shown, Equation 4 defines the similarity value $S_{FCD}$ based on file content data $F_i$ that is included in the current user context and based on file content data $F_j$ that is included in the stored user context. In one embodiment, $F_i$ and $F_j$ are each a different set of values, where each value in the set of values represents a number of a particular type of object included in a drawing file generated by a CAD application.

In embodiments where the current user context and the stored user context are based on profile data, the context engine may generate a similarity value according to Equation 5:

$$\frac{\sum_{b=n,s,t} \frac{|LCS(str_{bi}, str_{bj})| * weight_b}{|MaxLength(str_{bi}, str_{bj})|}}{\sum_{b=n,s,t} weight_b} \quad (5)$$

LCS( ) and MaxLength( ) are the same functions described above in conjunction with Equation 3. In Equation 5, $str_{bi}$ is a string of characters specified in profile data included in the current user context. $str_{bi}$ may be, for example, the name of the company that employs the user. Additionally, $str_{bj}$ represents a string of characters specified in profile data included in the stored user context. $weight_b$ is a parameter that may take on a range of values.

In embodiments where the current user context and the stored user context each include two or more of command data, external software data, working file data, content data, and profile data, the context engine 302 may generate the similarity value based on a combination of $S_{CMD}$, $S_{EXT}$, $S_{WFD}$, $S_{FCD}$ and $S_{PD}$. For example, the context engine 302 may generate the similarity value based on a weighted average of $S_{CMD}$, $S_{EXT}$, $S_{WFD}$, $S_{FCD}$, and $S_{PD}$. Those skilled in the art will recognize that, in addition to the different techniques described above for generating similarity values, any other technically feasible approach for generating similarity values based on any type of data included in the current user context and the stored user contexts falls within the scope of the present invention.

In one embodiment, the context engine 302 generates a similarity value for one or more of the stored user contexts and transmits the similarity values to the resource engine 306. In another embodiment, the context engine 302 may identify the similarity values that are greater than a similarity value threshold and then only transmits the identified similarity values to the resource engine 306. In yet another embodiment, the context engine 302 may transmit the p greatest similarity values to the resource engine 306, where p is an integer.

The resource engine 306 is configured to generate a relevance score for one or more of the resources in the resource database 308. As indicated in FIG. 1, a resource may include, among other things, a help file, a video, or a sample of executable code. Each of the resources included in the resource database 308 is associated with one or more of the stored user contexts.

The resource engine 306 generates a relevance score for each resource based on the similarity scores corresponding to the stored user contexts with which the resource is associated.

For example, a resource R in the resource database 308 may be associated with user contexts $C_1, C_2, \ldots, C_N$. The resource engine 306 generates a relevance score for the resource R based on the similarity values generated for $C_1$, $C_2$ and $C_3$. In one embodiment, the relevance score RLV for a resource R is generated according to Equation 6:

$$RLV = \frac{\sum_{i=1:n} S_i^3}{\sum_{i=1:m} S_i^3} \quad (6)$$

As shown, this equation defines the relevance score RLV for the resource R based on n similarity scores $S_i$ generated for n stored user contexts that are associated with the resource R and based on m total similarity scores $S_i$ generated for all m stored user contexts for which the context engine 302 provided a similarity score. In one embodiment, the resource engine 306 generates a resource list reflecting the resources for which a relevance score was generated. The resource list may also specify a ranking of the resources based on the relevance scores associated with those resources. In another embodiment, the resource engine 306 may identify resources with a relevance score greater than a relevance threshold value and then generate the resource list based only on the identified resources. In yet another embodiment, the resource list may reflect a set of resources with the q greatest relevance scores, where q is an integer.

Upon generating the resource list, the resource engine 306 transmits the resource list to the UDE 206. Referring back now to FIG. 2, the UDE 206 receives the resource list and then displays to the end-user at least a portion of the resource list or information related to at least one resource reflected in the resource list based in part on the ranking of each resource. In one embodiment, the UDE 206 also displays to the end-user a thumbnail image for a resource reflected in the resource list with a link corresponding to the resource. The UDE 206 receives from the end-user a selection of a link to a resource and then retrieves the resource associated with the selected link from the I/O devices 114, the memory 116, or from another computer system via the network 118. For example, if the resource list specifies a web link, then the UDE 206 displays the web link to the end-user. If the end-user selects the web link, then the UDE 206 accesses the web page and retrieves information associated with the web page for the end-user. In one embodiment, the UDE 206 retrieves resources from the resource database 308. In another embodiment, the UDE 206 may display to the end-user a thumbnail image for a resource on the resource list and a link that corresponds to the resource.

In one embodiment, the resource engine 306 transmits the resource list to the UDE 206 and also transmits one or more of the resources reflected in the resource list and included in the resource database 308 to the UDE 206. The UDE 206 then displays on a display screen the received resources according to the ranking specified in the resource list.

Those skilled in the art will recognize that although the foregoing description is directed towards the endpoint machine 110.1 transmitting data to and receiving data from the server 120, any of the endpoint machines 110.1-110.N can be configured to implement any of the different functionalities set forth above with respect to the endpoint machine 110.1.

In addition, the server 120 may be configured to receive a current user context from any or all of the endpoint machines 110.1-110.N and may be configured to process those current user contexts in real-time, in series or in parallel or in some combination thereof.

Figure 4:
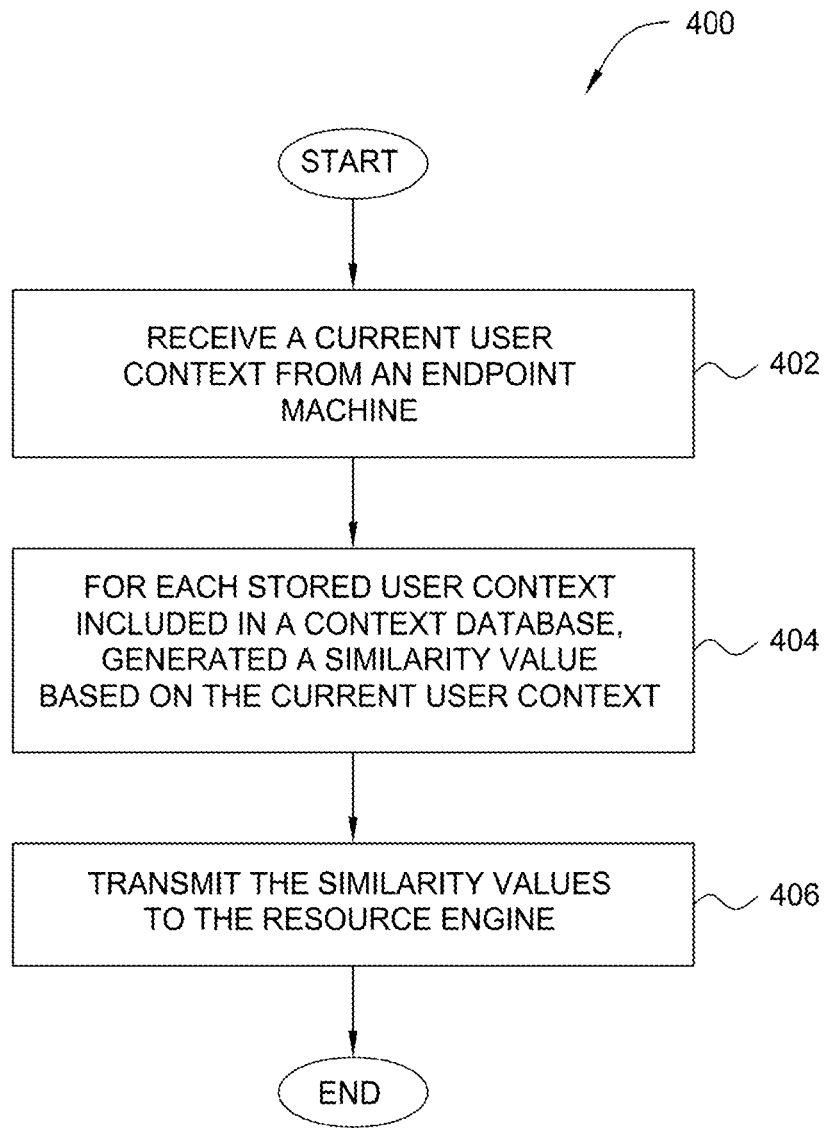
FIG. 4 is a flowchart of method steps for generating a similarity value for one or more current user contexts, according to one embodiment of the invention.

FIG. 4 is a flowchart of method steps for generating a similarity value for one or more current user contexts, according to one embodiment of the invention. Persons skilled in the art will understand that, although the method 400 is described in conjunction with the systems of FIGS. 1-3, any system configured to perform the method steps, in any order, is within the scope of the present invention.

As shown, the method 400 begins at step 402 where the context engine 302 receives a current user context from the endpoint machine 110.1. The current user context characterizes a flow of operations performed by the end-user when interacting with the software application 202. For example, the current user context could include command data comprising a list of commands recently issued by the end-user to the software application 202 or, alternatively, the current user context could include file content data comprising a list of the different types of data generated by the end-user with the software application 202.

At step 404, the context engine 302 generates a similarity value for each stored user context included in the context database 304. The stored user contexts may be generated based on a flow of operations previously performed by the end-user when interacting with the software application executing on the endpoint machine 110.1 or, alternatively, may be pre-loaded into the context database. In one embodiment, the stored user contexts are received from the endpoint machines 110.1-110.N. The context engine 302 generates a similarity value for each comparison based on the type of data included in the current user context and in the stored user context to which the current user context is compared. For example, if the current user context and the stored user context both include command data, then Equation 1 is implemented as described in FIG. 3 to generate the similarity value.

At step 406, the context engine 302 transmits the similarity values to the resource engine 306. In one embodiment, the context engine 302 generates a similarity value for one or more of the stored user contexts and transmits the similarity values to the resource engine 306. In another embodiment, the context engine 302 may identify the similarity values that are greater than a similarity value threshold and then only transmit the identified similarity values to the resource engine 306. In yet another embodiment, the context engine 302 may transmit the p greatest similarity values to the resource engine 306, where p is an integer.

Figure 5:
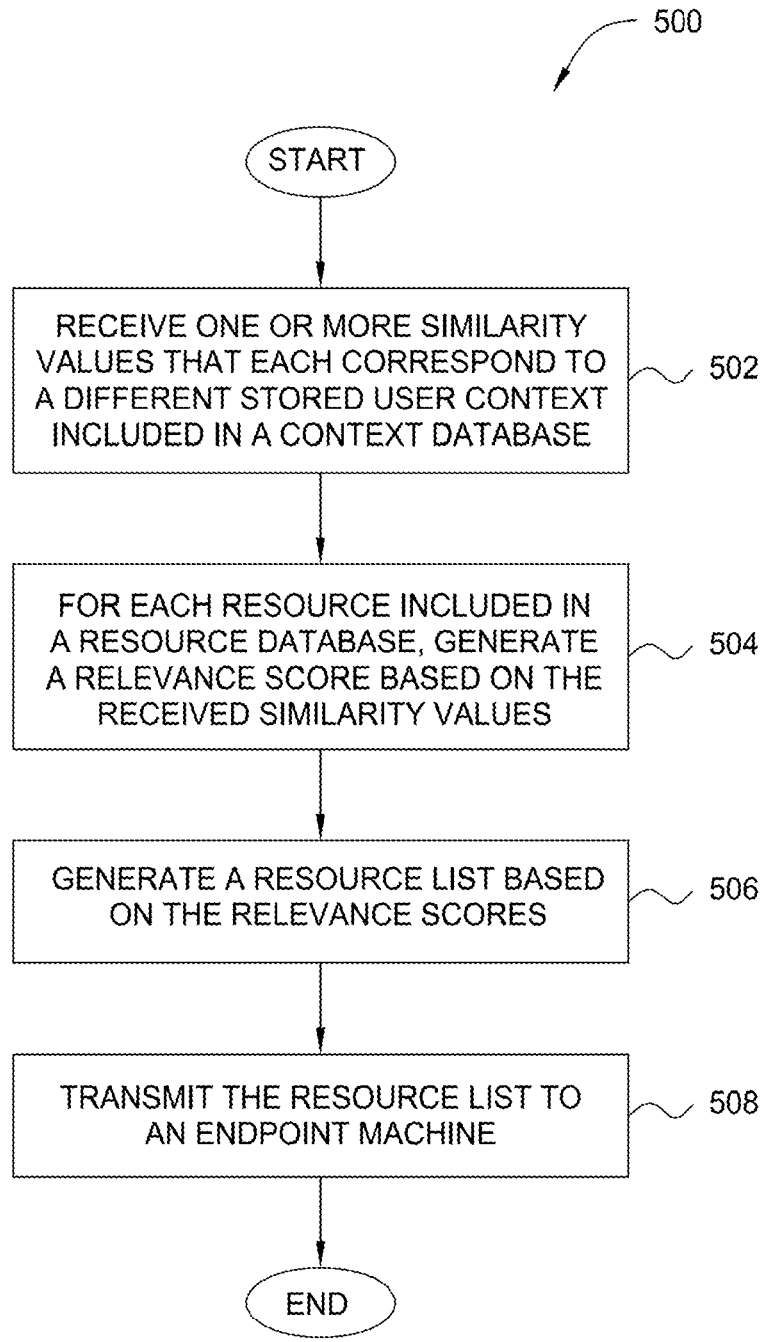
FIG. 5 is a flowchart of method steps for generating a resource list, according to one embodiment of the invention.

FIG. 5 is a flowchart of method steps for generating a resource list, according to one embodiment of the invention. Persons skilled in the art will understand that, although the method 500 is described in conjunction with the systems of FIG. 1-3, any system configured to perform the method steps, in any order, is within the scope of the present invention.

As shown, the method 500 begins at step 502, where the resource engine 306 receives from the context engine 302 one or more similarity values that each corresponds to a different stored user context included in the context database 304. In one embodiment, the similarity values are generated by the context engine 302 based on one or more of Equations 1-5, as previously described.

At step 504, the resource engine 306 generates a relevance score for each resource included in the resource database 306 based on the received similarity values. Each resource is associated with one or more stored user contexts that may have a corresponding similarity value. The resource engine 306 generates the relevance score for a particular resource based on the similarity scores corresponding to the stored user contexts with which the resource is associated. In one embodiment, the resource engine 306 generates the relevance score for each resource based on Equation 6.

At step 506, the resource engine 306 generates a resource list based on the relevance scores. In one embodiment, the resource engine 306 generates a resource list including the resources for which a relevance score was generated. The resource list may also specify a ranking of the resources based on the relevance scores associated with those resources. In another embodiment, the resource engine 306 may identify resources with a relevance score greater than a relevance score threshold value and then only include the identified resources in the resource list. In yet another embodiment, the resource list may include a set of resources with the q greatest relevance scores, where q is an integer.

At step 508, the resource engine 306 transmits the resource list to the UDE 206. The UDE 206 then displays to the end-user at least a portion of the resource list or information related to the resources reflected in the resource list via the I/O devices 114. Based on a selection received from the end-user of a resource reflected in the resource list, the UDE 206 retrieves one or more resources. The retrieved resources are then displayed to the end-user. In one embodiment, the resource engine 306 transmits one or more of the resources in the resource list to the endpoint machine 110.1.

Figure 6:
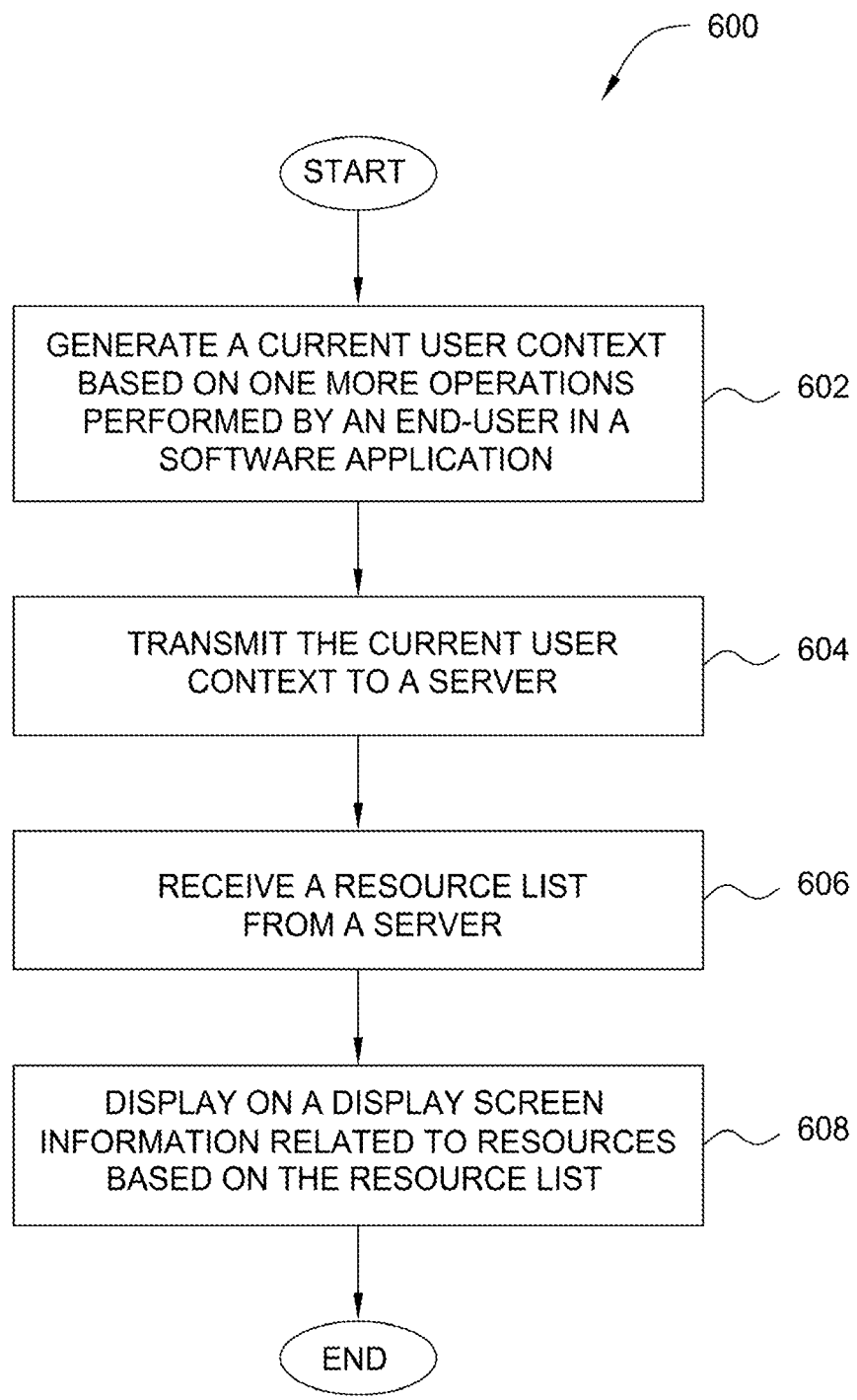
FIG. 6 is a flowchart of method steps for displaying one or more resources to an end-user based on a current user context, according to one embodiment of the invention.

FIG. 6 is a flowchart of method steps for displaying one or more resources to an end-user based on a current user context, according to one embodiment of the invention. Persons skilled in the art will understand that, although the method 600 is described in conjunction with the systems of FIG. 1-3, any system configured to perform the method steps, in any order, is within the scope of the present invention.

As shown, the method 600 begins at step 602, where the UDE 206 generates a current user context based on one or more operations performed by an end-user in the software application 202. The current user context is a set of data that characterizes the interactions between the end-user and the software application 202. In one embodiment, the UDE 206 records inputs issued by the end-user to the software application 202 and, additionally, records outputs generated by the software application 202 in response to those user inputs. The UDE 206 then generates the current user context based on the recorded inputs and outputs. In another embodiment, the UDE 206 may generate the current user context based on personal and/or professional information associated with the end-user. In further embodiments, the UDE 206 may generate the current user context based on data modified by the end-user via the software application 202 or based on a list of software applications executing on the endpoint machine 110.1 other than the software application 202.

At step 604, the UDE 206 transmits the current user context to the server 120. The UDE 206 accesses the server 120 via the network 118. The network 118 may be, for example, the World Wide Web, the Internet, a LAN, a WAN, an intranet, a cellular network, or any other technically feasible type of network that allows data transfers between the endpoint machine 110.1 and the server 120.

At step 606, the UDE 206 receives a resource list from the server 120. In one embodiment, the resource list reflects one or more of the resources included in the resource database 306 and also specifies a ranking of those resources. The resource list may include resources relevant to the flow of operations currently being performed by the end-user with the software application 202 and may thus aid the end-user with those operations.

At step 608, the UDE 206 displays on a display screen information related to each resource based on the resource list. In one embodiment, the UDE 206 displays the information related to each resource based on the ranking of the resources specified in the resource list. In another embodiment, the UDE 206 may display to the end-user a thumbnail image for a resource specified in the resource list with a link corresponding to the resource. The UDE 206 then receives from the end-user a selection of a resource and retrieves the selected resource from the I/O devices 114, the memory 116, the resource database 308, or from another computer system via the network 118. The end-user is thus provided with resources relevant to the flow of operations currently being performed by the end-user with the software application 202.

In addition to generating the current user context and displaying to the end-user information associated with resources that are pertinent to the current user context, the UDE 206 is also configured to provide a current user context and resources associated with the current user context to the server 120. The current user context and the associated resources are then used to update the context database 304 and the resource database 308, as described below in FIG. 7.

Figure 7:
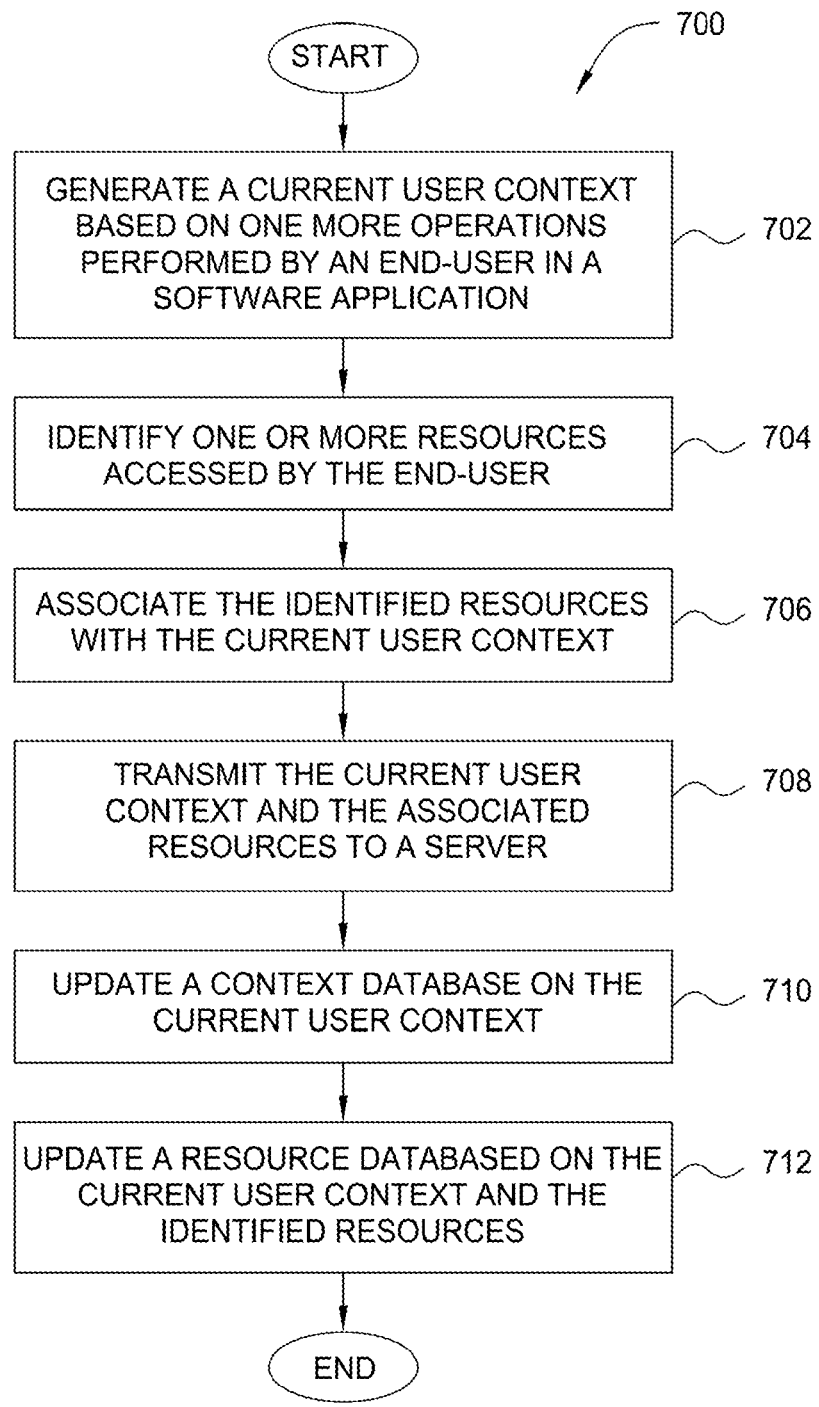
FIG. 7 is a flowchart of method steps for updating a context database and a resource database, according to one embodiment of the invention.

FIG. 7 is a flowchart of method steps for updating the context database 304 and the resource database 308, according to one embodiment of the invention. Persons skilled in the art will understand that, although the method 700 is described in conjunction with the systems of FIG. 1-3, any system configured to perform the method steps, in any order, is within the scope of the present invention.

As shown, the method 700 begins at step 702, where the UDE 206 generates a current user context based on one or more operations performed by the end-user in the software application 202. The UDE 206 generates the current user context by implementing any of the previously described techniques for generating the current user context.

At step 704, the UDE 206 identifies one or more resources accessed by the end-user. For example, the UDE 206 could identify a website accessed by the end-user when the software application 202 is open. The website may include information relevant to usage of the software application 202. In another example, the UDE 206 could identify a text file generated by the end-user when the software application 202 is open. The text file could include notes regarding how to perform a specific task with the software application 202. In yet another example, the UDE 206 could identify a resource indicated by the end-user when the software application 202 is open. The resource could be relevant to the different operations performed by the end-user in the software application 202.

At step 706, the UDE 206 associates the current user context with the identified resources. The identified resources may be relevant to the flow of operations currently being performed by the end-user in the software application 202. The identified resources may also include resources indicated by the end-user to be relevant to that flow of operations.

At step 708, the UDE 206 transmits the current user context and the associated resources to the server 120.

At step 710, the context engine 302 updates the context database 304 based on the current user context. In one embodiment, the context engine 302 includes the current user context in the context database 304. In another embodiment, the context engine 302 may generate a similarity value based on comparing the current user context to one or more stored user contexts included in the context database 304. If the maximum similarity value generated for each of the stored user contexts is less than an update threshold value, then the context engine 302 includes the current user context in the context database.

At step 712, the resource engine 306 updates the resource database 308 based on the current user context and the associated resources. In one embodiment, the resource engine 306 includes the resources associated with the current user context in the resource database 308 with information indicating the current user context with which the resources are associated. In embodiments where the current user context is not added to the context database 304, then the resource engine 306 may include the resources associated with the current user context in the context database 308 along with information that indicates one of the stored user contexts in the context database 304.

Through the foregoing technique, the context database 304 and the resource database 308 can be updated continuously to include additional current user contexts and additional resources associated with those current user contexts. Again, those skilled in the art will recognize that the additional user contexts and the additional resource may be transmitted to the server 120 by any of the endpoint machines 110.1-110.N.

Figure 8:
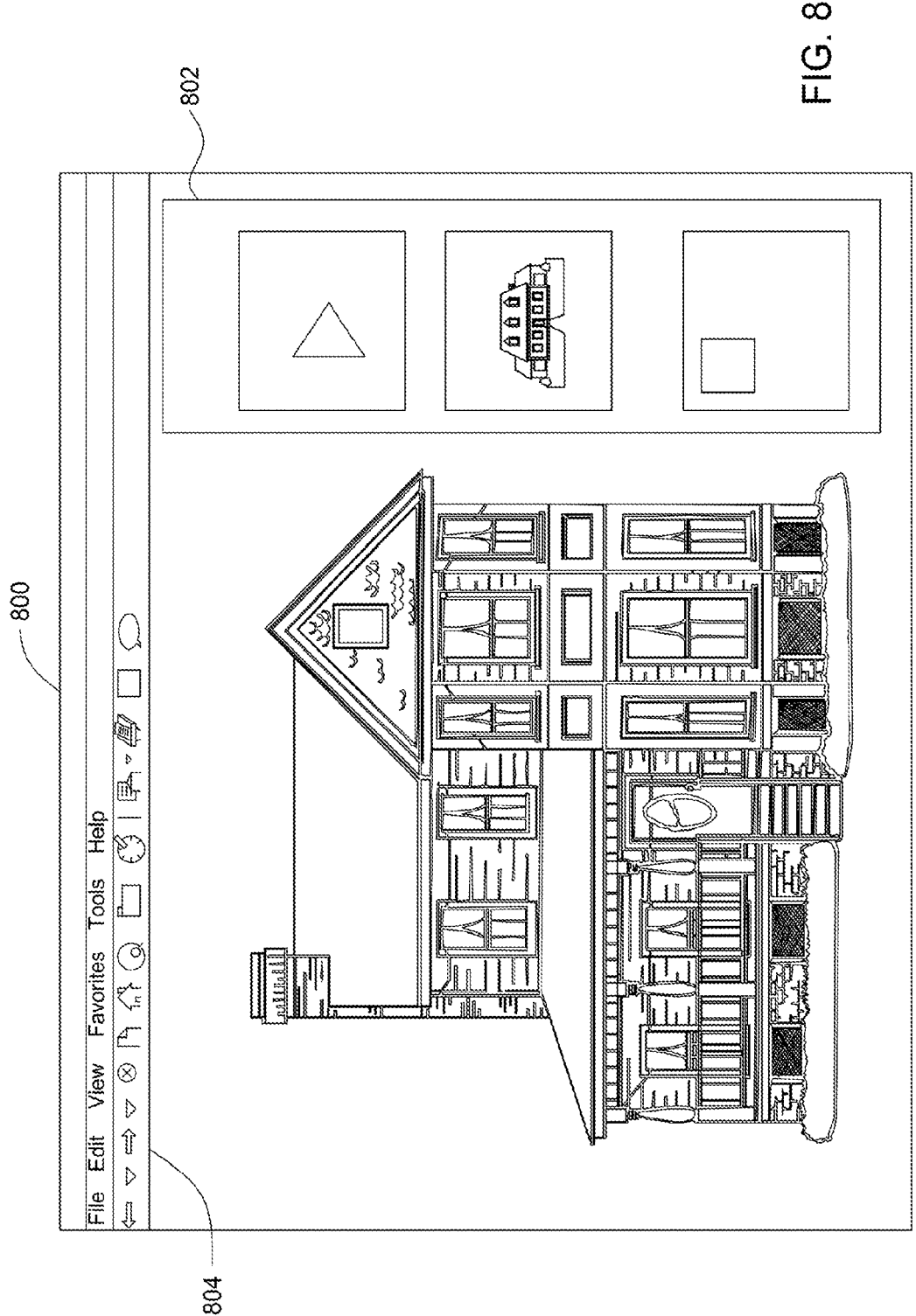
FIG. 8 is an exemplary screenshot of resources displayed with a CAD application, according to one embodiment of the invention.

FIG. 8 is an exemplary screenshot 800 of resources displayed within a CAD application, according to one embodiment of the invention. As shown, FIG. 8 includes the screenshot 800, a CAD program 802, and a resource panel 802. An end-user of the CAD program 804 performs a sequence of operations when interacting with the CAD program 804. The UDE 206 generates a current user context based on the sequence of operations performed by the end-user and transmits the current user context to the server 120. The UDE 206 then receives the resource list and displays information related to the resources in the resource list in the resource panel 802. In one embodiment, the resource panel 802 also includes thumbnail images of the resources in the resource list, or the resources in the resource list. The end-user accesses the resources in the resource panel using the I/O devices 114.

In sum, a user data engine (UDE) generates a current user context based on a flow of operations performed by an end-user when interacting with a software application. The UDE transmits the current user context to a server that includes a context engine, a context database, a resource engine, and a resource database. The context engine then compares the current user context to one or more "stored user contexts" included in the context database. Based on each comparison, the context engine generates a similarity value that represents a degree of similarity between the current user context received from the UDE and the stored user context. The context engine then transmits the similarity value generated for each of the stored user contexts to the resource engine.

The resource engine accesses one or more resources stored in the resource database. The one or more resources include help files, videos and/or samples of executable code. Each of the resources is associated with one or more of the stored user contexts. The resource engine generates a relevance score for each resource based on the similarity scores corresponding to the stored user contexts with which the resource is associated. The resource engine then generates a resource list that reflects one or more resources. The resource list specifies a ranking of the resources included in the resource list based on the relevance scores of those resources. The resource engine transmits the resource list to the UDE. The UDE displays to the end-user information associated with one or more of the resources reflected in the resource list and, based on a selection of a resource made by an end-user, retrieves the selected resource.

The UDE is further configured to generate a current user context when the end-user accesses, generates or indicates one or more resources when performing a flow of operations with the software application. The UDE associates the one or more resources accessed, generated or indicated by the end-user and associates those resources with the current user context. The UDE transmits the current user context and the associated resources to the context engine and to the resource engine. The context engine updates the context database based on the current user context received from the UDE. The resource engine updates the resource database based on the current user context and the associated resources.

One advantage of the disclosed system is that the UDE provides the end-user with access to an expansive pool of resources that includes significantly more information that the initial database of help files provided to the end-user via the help engine. The end-user is therefore much more likely to locate information that assists the end-user with usage of the software application. Another advantage is that the pool of resources is continuously expanded to include additional resources accessed, generated or indicated by a multitude of different end-users while performing various flows of operations with the software application. The UDE may thus provide resources to an end-user that are derived from the multitude of different end-users.

While the forgoing is directed to embodiments of the invention, other and further embodiments of the invention may be devised without departing from the basic scope thereof. For example, aspects of the invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer system, comprising:
an endpoint machine that includes a user data engine (UDE) configured to:
generate a current user context reflecting a first flow of operations performed by an end-user when interacting with a software application executing on the endpoint machine, and
transmit the current user context to a context engine residing within a server machine; and
the server machine that also includes a resource engine, a context database and a resource database,
wherein the context engine is configured to:
compare the current user context to a stored user context included in the context database, wherein the stored user context reflects a second flow of operations performed during a prior interaction with the software application or with an instance or a version of the software application,
generate a similarity value for the stored user context based on comparing the current user context to the stored user context, wherein the similarity value indicates a degree of similarity between the first flow of operations and the second flow of operations, and transmit the similarity value to the resource engine.

2. The computer system of claim 1, wherein context engine is configured to compare at least one of command data, external software data, working file data, file content data, or profile data associated with the current user context to corresponding command data, external software data, working file data, file content data, or profile data associated with the stored user context.

3. The computer system of claim 2, wherein the context engine is configured to generate the similarity value based on one or more equations, and each of the equations corresponds to a different type of data included in the current user context.

4. The computer system of claim 1, wherein the context engine is configured to generate additional similarity values for each of the other stored user contexts in the context database.

5. The computer system of claim 4, wherein the context engine is configured to transmit at least a subset of the additional similarity values for each of the other stored user contexts in the context database to the resource engine.

6. The computer system of claim 5, wherein the subset includes similarity values exceeding a similarity threshold value.

7. The computer system of claim 1, wherein the current user context is included in the context database.

8. The computer system of claim 1, wherein the UDE is further configured to:
receive one or more inputs issued by the end-user to the software application, wherein the one or more inputs include commands issued by the end-user to the software application;
receive one or more outputs generated by the software application in response to the one or more inputs issued by the end-user; and
generate the current user context based on the one or more inputs issued by the end-user and the one or more outputs generated by the software application, wherein the current user context includes at least one of command data, external software data, working file data, file content data, or profile data.

9. The computer system of claim 1, wherein that current user context includes a frequency value with which the commands are issued by the end-user to the software application.

10. A computer system, comprising:
an endpoint machine that includes a user data engine (UDE) configured to:
generate a current user context reflecting a first flow of operations performed by an end-user when interacting with a software application executing on the endpoint machine, and
transmit the current user context to a context engine residing within a server machine; and
the server machine that also includes a resource engine, a context database and a resource database,
wherein the resource engine is configured to:
receive a similarity value from the context engine, wherein the similarity value indicates a degree of similarity between the first flow of operations and a second flow of operations performed during a prior interaction with the software application or with an instance or a version of the software application;
identify one or more resources stored in the resource database and associated with a stored user context included in the context database, wherein the one or more resources include content related to the first flow of operations,
generate a relevance score for each of the one or more resources based at least in part on the similarity value associated with the stored user context,
generate a resource list that reflects at least one of the one or more identified resources based on the relevance scores generated for the identified one or more resources, and
transmit the resource list to the UDE within the endpoint machine.

11. The computer system of claim 10, wherein the current user context includes a frequency value with which the commands are issued by the end-user to the software application.

12. The computer system of claim 10, wherein the resource engine is further configured to receive at least one additional similarity value corresponding to a different stored user context in the context database, each of the one or more resources are also associated with the different stored user context, and the relevance score generated for each of the one or more resources is based on the similarity value associated with the stored user context and the at least one additional similarity value corresponding to the different stored user context.

13. The computer system of claim 12, wherein the resource engine is further configured to:
compute a numerator equal to the sum of the cube of the similarity value cubed and the cube of the at least one additional similarity value;
compute a denominator equal to the cube of the sum of the similarity value and every other similarity value received from the context database; and
divide the numerator by the denominator.

14. The computer system of claim 10, wherein the at least one resource reflected in the resource list has a relevance score exceeding a relevance threshold value.

15. The computer system of claim 10, wherein the resource list reflects a subset of the one or more identified resources having the greatest relevance scores.

16. The computer system of claim 10, wherein the at least one resource comprises a help file, a text file, a video, a tutorial, a sample of executable code, a command listing, or a file that may be accessed by the software application.

17. The computer system of claim 10, wherein the UDE is configured to:
receive one or more inputs issued by the end-user to the software application, wherein the one or more inputs include commands issued by the end-user to the software application;
receive one or more outputs generated by the software application in response to the one or more inputs issued by the end-user; and
generate the current user context based on the one or more inputs issued by the end-user and the one or more outputs generated by the software application, wherein the current user context includes at least one of command data, external software data, working file data, file content data, or profile data.

18. The computer system of claim 17, wherein the command data includes a list of commands issued to the software application, the external software data includes a list of one or more software applications that operate concurrently with the software application, the working file data includes a list of files modified with the software application, the file content data includes a list of different types of file content modified with the software application, and the profile data includes a list of personal and/or professional information associated with the end-user of the software application or with another end-user of the software application.

19. The computer system of claim 10, wherein the UDE is further configured to:
   receive the resource list from the resource engine executing within the server machine; and
   display on a display device associated with the endpoint machine at least a portion of the resource list or information related to at least one resource reflected in the resource list.

20. The computer system of claim 10, wherein the UDE is further configured to:
   identify at least one resource accessed by the end-user when interacting with the software application;
   associate the at least one resource with the current user context; and
   transmit the at least one resource to the resource engine executing within the server machine.

* * * * *